United States Patent [19]

Han

[11] Patent Number: 5,347,404
[45] Date of Patent: Sep. 13, 1994

[54] APPARATUS FOR RECORDING AND REPRODUCING CAPTION INFORMATION ON AN AUDIO TRACK OF A VIDEO TAPE USED IN A VIDEO TAPE RECORDER

[75] Inventor: Hyeong-Deok Han, Seoul, Rep. of Korea

[73] Assignee: SamSung Electronics Co., Ltd., Suwon, Rep. of Korea

[21] Appl. No.: 766,775

[22] Filed: Sep. 27, 1991

[30] Foreign Application Priority Data

Dec. 12, 1990 [KR] Rep. of Korea .................... 90-19635

[51] Int. Cl.$^5$ .............................................. G11B 5/02
[52] U.S. Cl. .................................... 360/19.1; 358/343
[58] Field of Search ................. 360/19.1, 18, 33.1, 360/46, 67; 358/341, 343

[56] References Cited

U.S. PATENT DOCUMENTS

| | | | |
|---|---|---|---|
| 4,295,154 | 10/1981 | Hata et al. | 360/19.1 X |
| 4,453,186 | 6/1984 | Watatani et al. | 360/19.1 X |
| 4,499,506 | 2/1985 | Takahashi et al. | 360/33.1 X |
| 4,509,083 | 4/1985 | Nakano | 360/19.1 X |
| 4,833,549 | 5/1989 | Yoshimoto et al. | 360/19.1 |
| 4,949,173 | 8/1990 | Mitsuhashi | 358/108 |
| 5,023,548 | 6/1991 | McMorran | 324/212 |
| 5,055,938 | 10/1991 | Misumi et al. | 360/19.1 X |
| 5,082,729 | 1/1992 | Nishida et al. | 428/329 |
| 5,099,365 | 3/1992 | Kang | 360/61 |

*Primary Examiner*—Andrew L. Sniezek
*Attorney, Agent, or Firm*—Robert E. Bushnell

[57] ABSTRACT

An apparatus for recording and reproducing a caption signal on and from an audio track of a video tape, used in a video tape recorder. The apparatus includes a microprocessor, a character buffer, a recording code converter, a linear audio recording/reproducing circuit, a mode selector, a reproducing code converter, a Hi-Fi audio recording/reproducing circuit, an audio output controller, a video signal processor, and an on-screen-display circuit, whereby the caption character signal is recorded and reproduced by the audio head on and from the audio track of the video tape.

12 Claims, 4 Drawing Sheets

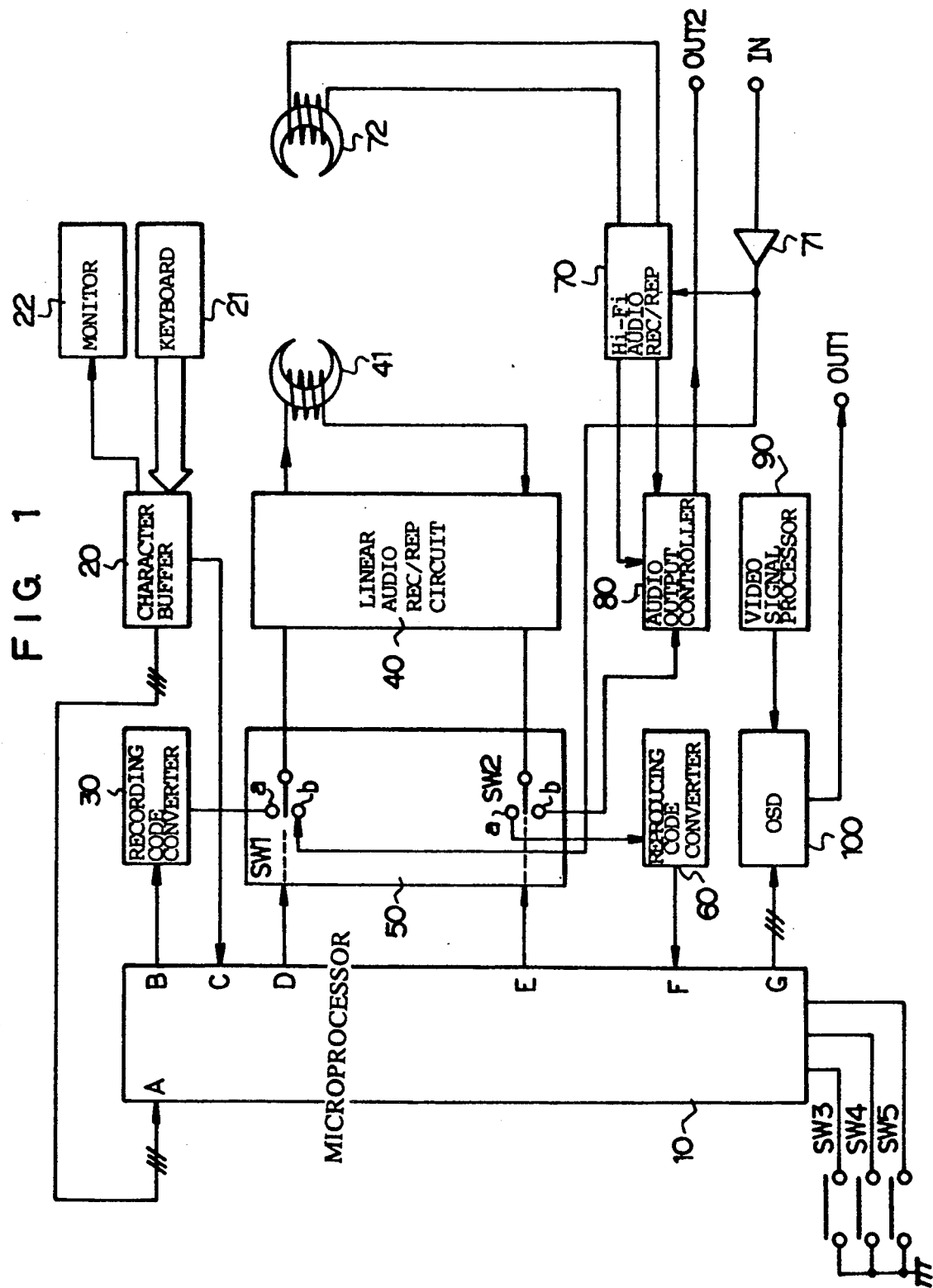

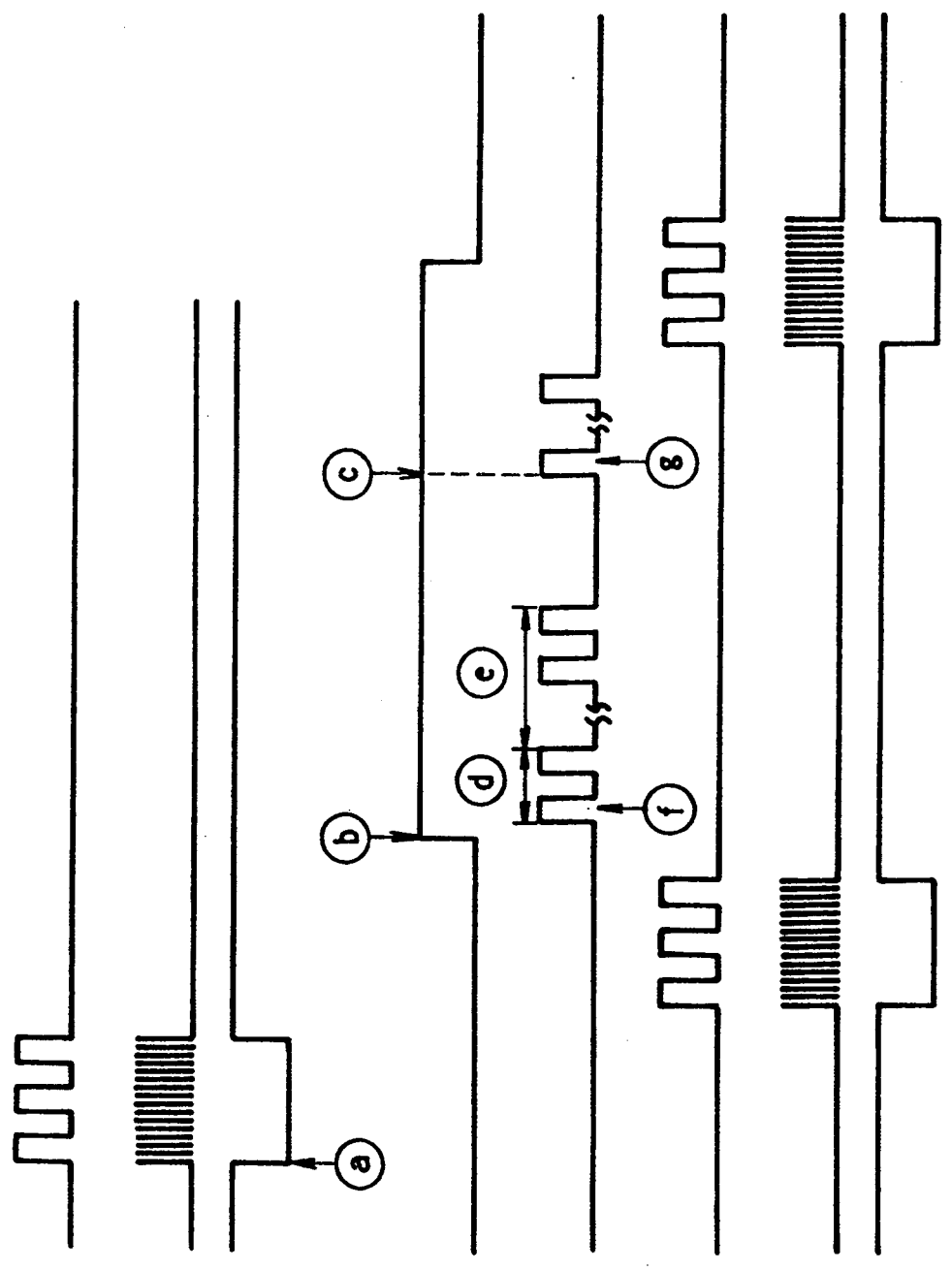

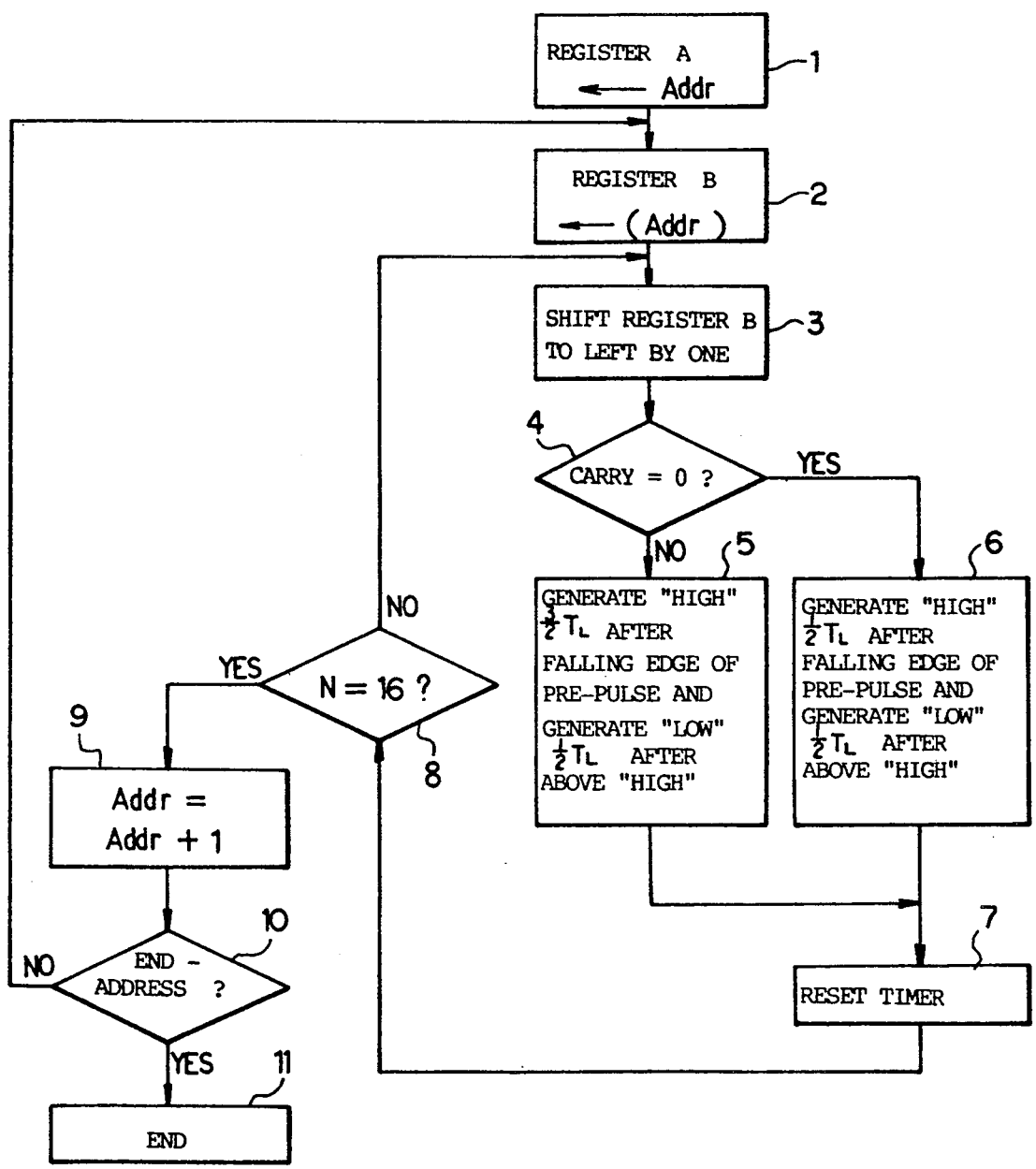

APPARATUS FOR RECORDING AND REPRODUCING CAPTION INFORMATION ON AN AUDIO TRACK OF A VIDEO TAPE USED IN A VIDEO TAPE RECORDER

BACKGROUND OF THE INVENTION

This invention relates to an apparatus for recording and reproducing a caption signal and in particular, to an apparatus for recording and reproducing used in a video tape recorder (hereinafter, referred to as a VTR) system, wherein the caption character signal (hereinafter, called a caption signal, for short) is recorded and reproduced on and from an audio track of the video cassette tape.

In a conventional VTR system, a video head included in an expensive caption editor is used for recording the caption signal on the video tape. If, however, the caption signal is recorded by the video head on the video track of the video tape, it is impossible to erase the caption signal later on.

SUMMARY OF THE INVENTION

It is therefore an object of the present invention to provide an apparatus for recording and reproducing the caption signal on an audio track of the video tape by means of an audio head in a video tape recorder, thereby allowing the apparatus to freely record and/or erase the caption signal when necessary.

According to one aspect of the present invention, the apparatus includes: a microprocessor for having a program for controlling caption character data; a character buffer (20) for memorizing character data received from a keyboard (21) and providing a monitor (22) with the character data memorized in response to a control signal from said microprocessor (10); a recording code converter (30) for converting the character data from said microprocessor (10) into an audio frequency signal; a linear audio recording/reproducing circuit (40) for recording a mono-audio signal on a video tape via a linear audio head (41) or processing the mono-audio signal received from the linear audio head (41); a mode selector (50) for selecting one of either a caption recording or reproducing signal to be applied to and received from said linear audio recording/reproducing circuit (40), in response to a control signal from said microprocessor (10); a reproducing code converter (60) for converting the caption reproducing signal into a rectangular pulse code signal in response to a control signal for the caption reproducing mode of operation from said microprocessor (10), to thereby send said rectangular pulse code signal to said microprocessor (10); a Hi-Fi audio recording/reproducing circuit (70) for recording on the tape a Hi-Fi audio signal from a buffer 71 via a Hi-Fi audio head (72) or processing the Hi-Fi audio signal received from the Hi-Fi audio head; an output controller (80) for selecting one of the mono- and Hi-Fi audio signal output from said mode selector (50) and Hi-Fi audio recording/reproducing circuit (70), respectively; and a video signal processor (90) for processing video signal, an on-screen-display circuit (100) receiving said character data from the microprocessor (10), for generating a character display signal, said character display signal being mixed with the video signal.

BRIEF DESCRIPTION OF THE ACCOMPANYING DRAWINGS

For a better understanding of the invention and to show how the same may be carried into effect, reference will now be made, by way of example, to the accompanying schematic drawings, in which:

FIG. 1 is a block diagram of an apparatus for recording and reproducing the caption signal according to the present invention;

FIGS. 2A to 2D are timing diagrams of the apparatus of FIG. 1;

FIG. 3 is a pulse code signal which is communicated between a microprocessor (10) and a recording code converter (30) shown in FIG. 1;

FIG. 4 is a flow chart for showing the recording and reproducing procedure of the caption signal according to the present invention;

DETAILED DESCRIPTION OF THE PREFERRED EMBODIMENT

Figure 5:
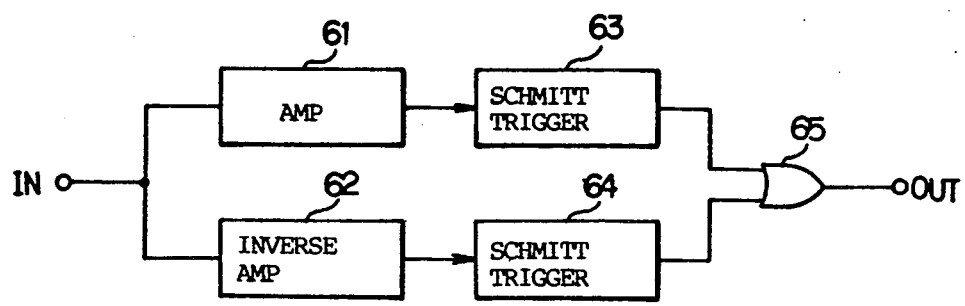
FIG. 5 is a detailed view of a reproducing code converter (60) shown in FIG. 1.

Referring to FIG. 1, an apparatus for recording and reproducing the caption signal in accordance with the present invention is illustrated. In the drawing, a microprocessor 10 including therein a program for recording-/reproducing the caption character, analyzes the character data received in series from a character buffer 20 and converts it into a sequential pulse signal having a transmission speed of about 240 characters per second. The character buffer 20 memorizes the character data transmitted from a keyboard 21 and provides a monitor 22 with the memorized character data. A recording code converter 30 converts a character pulse signal produced from the microprocessor 10 into an audio frequency signal. Furthermore, a linear audio recording/reproducing circuit 40 is used for recording a mono-audio signal on the tape through a linear audio head 41, or reproducing the recorded mono-audio signal through the linear audio head 41. Then, a mode selector 50 operates to select either a caption recording or reproducing signal applied to and received from the linear audio recording/reproducing circuit 40, in response to a control signal from the microprocessor 10 for selecting the caption recording or reproducing modes of operation. A reproducing code converter 60 converts the caption reproducing signals which is selected at the mode selector 50 according to the control signal for the caption reproducing mode into a caption character signal, and then, the converted caption character signal is applied to the microprocessor 10. A Hi-Fi (highfidelity) audio recording/reproducing circuit 70 records on the tape the audio signal received from an input terminal in through a buffer 71 by way of a Hi-Fi audio head 72, or reproduces the audio signal recorded on the tape by way of the Hi-Fi audio head 72. An audio output controller 80 processes the mono- or stereo-audio signals received from the mode selector 50 or the Hi-Fi audio recording/reproducing circuit 70, respectively, the processed signals being produced through an output terminal OUT2. A video signal processor 90 processes the video signal and an on-screen-display (OSD) circuit 100 receives the caption data from the microprocessor 10 so as to produce therefrom a character display signal carried by the video signal from the video signal processor 90, through an output terminal OUT1.

Operation of the apparatus for recording/reproducing the caption signal in accordance with the present invention will now be described hereinbelow with reference to FIGS. 1 and 2.

It is noted from FIG. 1 that the character buffer 20 temporarily memorizes the character data typed by the keyboard 21 serving as a character input device and transmits the character data to the monitor 22. In this way, when the caption character is displayed on the monitor, the user will determine a screen in still picture on which the caption character is to be written. At about this moment, if a character transmission switch SW3 is closed, the microprocessor 10 receives through a character identifying input port "C" the logic high signal indicating that the character buffer 20 has received the character data.

If the logic high signal is applied to the character identifying input port "C" of the microprocessor 10, the microprocessor 10 receives through a serial transmission input port "A" character data DATA, clock signal CLOCK and chip selection signal $\overline{CS}$, as shown in FIG. 2A. Herein, it should be noted that a position "a" in the chip selection signal represents the time at which the character transmission switch SW3 is closed.

The microprocessor 10 delivers the serial data read from the character buffer 20 into the OSD circuit 100 in the form of the waveforms shown in FIG. 2D. Then, the OSD circuit 100 generates the character display signal carried by the video signal from the video signal processor 90, through the output terminal OUT1.

In the meantime, if a caption recording switch SW5 of a toggle switch for switching between the caption recording mode of operation and the caption recording release mode of operation is closed to put the microprocessor 10 into the caption recording mode of operation, the microprocessor 10 converts the character data received from the character buffer 20 into a pulse code signal as shown in FIG. 2C, and transmits the pulse code signal to the recording code converter 30. This pulse code signal is comprised of 16 pulse codes represented by either a logic "0" or "1" as shown in detail in FIG. 3

Referring to FIG. 4, a flow chart is given for showing the program, performed by the microprocessor 10, of converting the character data received from the character buffer 20 into the pulse code signal. A head address of the memorized character data is stored into a register-A of the microprocessor 10 (Step 1), and the character data of the head address is stored into a register-B (Step 2). Then, the character data stored in the register-B is shifted to the left by one (Step 3) so as to check if a carry is generated (Step 4).

If a carry has been generated in the step 4, the logic high signal will be generated a period $(3/2)T_L$ after the falling edge of a pre-pulse of the character data and then, the logic low signal will be generated a period $(\frac{1}{2})T_L$ after the above logic high signal is generated (Step 5). If a carry has not been generated in the step 4, the logic high signal will be generated a period $(\frac{1}{2})T_L$ after the falling edge of the pre-pulse of the character data and then, the logic low signal will be generated a period $(\frac{1}{2})T_L$ after the above logic high signal generated (Step 6). During the steps 5 and 6, a timer for counting the time is reset (Step 7) and thereafter, whether the bit number N of the character data is identical to 16 is checked (Step 8). If the bit number is not identical to 16 in the step 8, the procedure returns to the step 3; however, if identical to 16, the address will increase by one (Step 9). Then, whether the address increased by one in the step 9 is identical to the end-address of the character data is checked (Step 10). If the address is not identical to the end-address, the procedure returns to the step 2; otherwise, if identical to the end-address, the procedure will be ended (Step 11).

As can be appreciated from the foregoing, during the caption recording mode of operation, the pulse code signal transmitted from the microprocessor 10 to the recording code converter 30 will transmit an initial pulse code "f" of one word "d" as illustrated in FIG. 2C, if the caption recording switch SW5 is closed. In a little while, if the caption recording mode of operation is released, a caption-end display pulse code "g" is generated by one word.

In the meantime, if a caption reproducing switch SW4 is closed to put the microprocessor 10 into the caption reproducing mode of operation, the microprocessor 10 encodes the character pulse input signal from the reproducing code converted 60 to memorize the encoded signal into a memory prepared therein. As regards the level determination of the encoded data stored in the memory, if $|\Delta T-T_L| < |\Delta T-T_H|$ after comparing each of $T_L$ and $T_H$ with a reference signal $\Delta T$ for the caption recording where the $T_L$ and $T_H$ is the time period from the falling edge of the pre-pulse transmitted from the microprocessor 10 to the falling edge of a pulse occurring immediately thereafter, then $\Delta T \cong T_L$; so that the level is determined as "1"; otherwise, if $|\Delta T-T_L| > |\Delta T-T_H|$, then $\Delta T \cong T_H$ so that the level is determined as "0".

Based on the above determination rule, the microprocessor 10 receives a set of 16 pulse codes of the character data from (to determine after turn) the reproducing code converter 60 so as to check each pulse code in turn if it is an initial pulse code. This checking is repeated until the initial pulse code is detected. If the microprocessor 10 has detected the initial pulse code, then each following set of 16 pulse codes applied to the microprocessor 10 from this time forward will form a word and sequentially, 239 words will be stored into the memory of the microprocessor 10. Thereafter, the microprocessor 10 transmits these 239 word to the OSD circuit 100 via a serial port "G" whereby the OSD circuit 100 generates the character display signal. This character display signal from the OSD circuit 100 is carried by the video signal from the video signal processor 90 so as to be provided to the output terminal OUT1. At this moment, if the data value of one word applied to the microprocessor 10 is identical to the caption-end display value i.e., address-end (see Step 10 in FIG. 4), the caption display is terminated.

A signal applied to the recording code converter 30 through a character pulse generating port "B" of the microprocessor 10 is as represented in FIG. 3, and converted by the recording code converter 30 into an audio frequency band signal. On the other hand, the mode selector 50 switches on and/or off the switches SW1 and SW2 in response to the caption recording and reproducing modes of operation from the microprocessor 10. The following Table represents an exemplary view of the mode establishment according to the position of the switches SW1 and SW2, where the "x" represents the don't care condition.

TABLE

|  | SW1 (switched) | SW2 (switched) |
| --- | --- | --- |
| CAPTION REC. MODE | to "a" | x |
| CAPTION REP. MODE | x | to "a" |
| NORMAL REP. MODE | to "b" | to "b" |

Accordingly, during the caption recording, the signal produced from the recording code converter 30 is applied to the linear audio head 41 through the linear audio recording/reproducing circuit 40. Furthermore, during the caption reproducing, the signal output from the linear audio head 41 is processed at the linear audio recording/reproducing circuit 40 and then, applied to the reproducing code converter 60 through the switch SW2 of the mode selector 50. The reproducing code converter 60 converts the audio frequency band signal input into the rectangular pulse as shown in FIG. 3 to provide it to a character pulse input port "F" of the microprocessor 10.

Figure 6A:
FIGS. 6A to 6F are waveforms at the respective parts of the reproducing code converter (60).
Figure 6B:
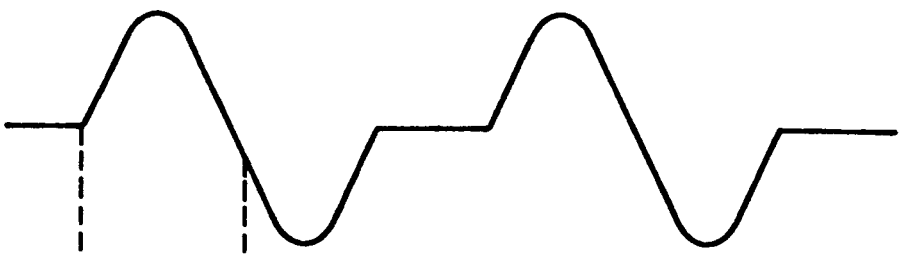
Figure 6C:
Figure 6D:
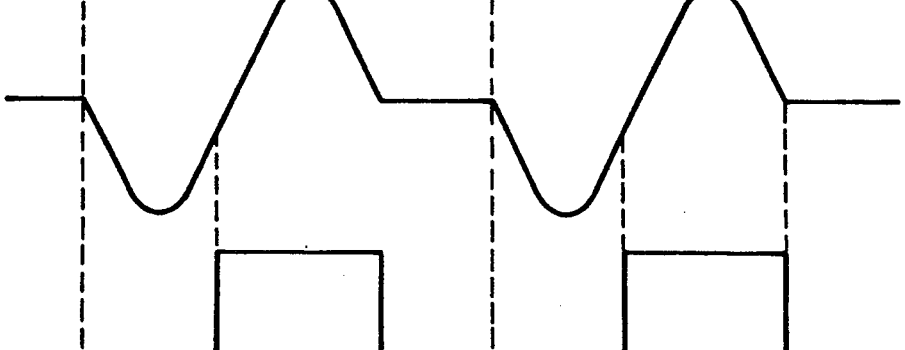

With reference to FIG. 5, the reproducing code converter 60 is comprised of an amplifier 61 and an inverse amplifier 62 which receive in common the audio frequency band signal of FIG. 6A from the mode selector 50, via the input terminal IN. The amplifier 61 amplifies the audio frequency band signal into the waveforms as shown in FIG. 6B and the inverse amplifier 62 amplifies the audio frequency band signal into the waveforms as shown in FIG. 6D. The signal output from the amplifier 61 is schmitt-triggered by a first schmitt trigger circuit 63 and the signal output from the inverse amplifier 62 is schmitt-triggered by the second schmitt trigger circuit 64.

Figure 6E:
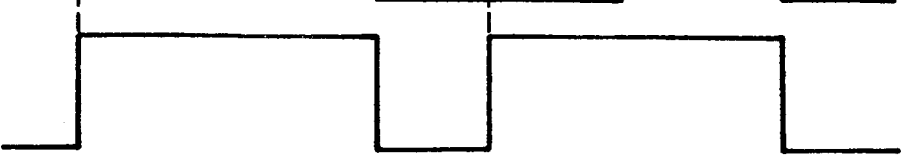
Figure 6F:
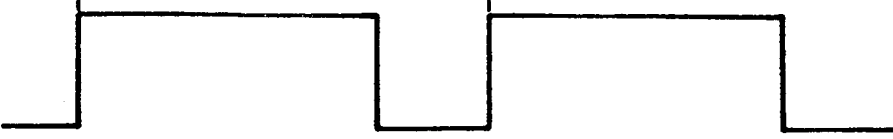

In this case, the first and second schmitt trigger circuits 63, 64 set more than 0 V for the rising edge input voltage and less than 0 V for the falling edge input voltage, respectively. The signals triggered by the first and second schmitt triggers 63, 64 are produced as shown in FIG. 6C and 6E, respectively, and ORed by an OR gate 65 to generate the waveforms of FIG. 6F to the character pulse input port "F" of the microprocessor 10.

The output signal of the OR gate 65 is a signal reproduced from the caption character pulse signal during the recording mode of operation and decoded by the microprocessor 10 to be applied to the OSD circuit 100 in which the signal is converted into a character display signal.

When the microprocessor 10 completes the receipt of the characters (i.e., 240×16 data-bits) for one frame from the reproducing code converter 60, it sends in series the OSD character display data to the OSD circuit 100. The OSD circuit 100 mixes the video signal from the video signal processor 90 with the character display data to provide the mixed signal to the output terminal OUT1.

On the other hand, however, if a control signal is not supplied to the mode selector 50 from a caption reproducing port "E" of the microprocessor 10, the switch SW2 is switched to the position "b" so that the reproducing audio signal will now be applied to the audio output controller 80. The Hi-Fi audio head 72 reproduces the audio signal recorded on the tape, by means of the Hi-Fi audio head 72 and this reproduced audio signal is generated to the output terminal OUT2 via the audio output controller 80.

As appreciated from the above descriptions, the inventive apparatus is designed such that the caption character signal can be recorded or erased by use of the audio head included in a VTR system. Therefore, a user of this apparatus can freely and efficiently edit the caption characters into a video tape.

Although specific constructions and procedures of the invention have been illustrated and described herein, it is not intended that the invention be limited to the elements and constructions disclosed. One skilled in the art will easily recognize that other particular elements or subconstructions may be used without departing from the scope and spirit of the invention.

What is claimed is:

1. An apparatus used in a video recorder, for recording and reproducing a caption signal comprised of a caption character display signal combined with a video signal, on an audio track of a video tape, said apparatus comprising:

character buffer means for memorizing caption character data received from a keyboard, and for providing a monitor with said caption character data;

processing means for converting said caption character data from said character buffer means to a pulse code signal during a caption recording mode;

recording code converter means for converting said pulse code signal into a first mono-audio frequency signal during said caption recording mode;

linear audio recording/reproducing means for recording said first mono-audio frequency signal on the video tape via a linear audio head, and for generating a processed mono-audio frequency signal by processing a reproduced mono-audio frequency signal received from said linear audio head;

reproducing code converter means for converting said processed mono-audio frequency signal into rectangular pulses;

said processing means for converting said rectangular pulses from said reproducing code converter means to reproduced caption character data during a caption reproducing mode;

Hi-Fi audio recording/reproducing means for recording on the video tape a first Hi-Fi audio signal received from a buffer via a Hi-Fi audio head and for generating a processed Hi-Fi audio signal by processing a reproduced Hi-Fi audio signal received from said Hi-Fi audio head;

output controller means for enabling transmission of said processed mono-audio frequency signal and said processed Hi-Fi audio signal from said linear audio recording/reproducing means and said Hi-Fi audio recording/reproducing means, respectively, to an output port;

mode selector means for enabling transmission of said first mono-audio frequency signal from said recording code converter means to said linear audio recording/reproducing means during said caption recording mode, and for enabling transmission of said processed mono-audio frequency signal from said linear audio recording/reproducing means to said reproducing code converter means during said caption reproducing mode;

video signal processor means for processing said video signal; and on-screen-display means for generating said caption signal, thereby enabling a visual display of a caption, in dependence upon said reproduced caption character data received from said processing means and said video signal from said video signal processor means.

2. The apparatus of claim 1, further comprised of said processing means converting said caption character data to said pulse code signal through steps comprising:
  a first step for storing a head address of said caption character data in a first register of said processing means;
  a second step for storing said caption character data of said head address in a second register of said processing means;
  a third step for shifting to the left by one said caption character data stored in the second register and determining whether a carry has been generated;
  a fourth step which, if a carry has been generated in said third step, generates a logic high signal a first period after a falling edge of a pre-pulse of said caption character data, then generates a logic low signal a second period after said logic high signal is generated, and if a carry has not been generated, generates said logic high signal said second period after said falling edge of the pre-pulse of said caption character data, then generates said logic low signal said second period after said logic high signal is generated, wherein said first period is longer than said second period;
  a fifth step which increases the head address by one if a bit number of said caption character data equals a predetermined number, and alternately returns to said third step if said bit number does not equal said predetermined number; and
  a sixth step which ends said converting of said caption character data if a current address equals an end address of said caption character data, and alternately returns to said second step if said current address does not equal said end address of said caption character data.

3. The apparatus of claim 2, wherein said pulse code signal generated by said processing means comprises:
  an initial pulse code; and
  a caption-end display pulse code.

4. The apparatus of claim 1, wherein said reproducing code converter means further comprises:
  an amplifier for receiving said processed mono-audio frequency signal and outputting an amplified audio frequency signal corresponding to said processed mono-audio frequency signal;
  an inverting amplifier for receiving said processed mono-audio frequency signal and outputting an inverted amplified audio frequency signal corresponding to said processed mono-audio frequency signal;
  a first Schmitt trigger for receiving said amplified audio frequency signal and outputting a first rectangular pulse signal corresponding to said amplified audio frequency signal; and
  a second Schmitt trigger for receiving said inverted amplified audio frequency signal and outputting a second rectangular pulse signal corresponding to said inverted amplified audio frequency signal; and
  logic means for receiving said first and second rectangular pulse signals and outputting said rectangular pulses in dependence upon said first and second rectangular pulses.

5. The apparatus of claim 1, wherein said processing means encodes said rectangular pulses received from said reproducing code converter means, and stores said encoded rectangular pulses as said reproduced caption character data during said caption reproduction mode.

6. The apparatus of claim 5, wherein said means stores said reproduced caption character data as a logic high signal if $T_L$ is closer to a reference period than $T_H$, where $T_L$ is a first period and $T_H$ is a second and longer period, and both $T_L$ and $T_H$ being time periods from a falling edge of a first pre-pulse transmitted from said processing means to a succeeding falling edge of a second pre-pulse, otherwise if $T_H$ is closer to said reference period than $T_L$, then said processing means stores said reproduced caption character data as a logic low signal.

7. The apparatus of claim 1, wherein said processing means converts said caption character data to said pulse code signal through steps comprising:
  storing a head address of said caption character data;
  storing said caption character data of said head address in a register;
  shifting to the left by one said stored caption character data and determining whether a carry has been generated;
  generating a logic high signal a first period after a falling edge of a pre-pulse of said caption character data, then generating a logic low signal a second period after said logic high signal is generated, if said carry has been generated, where said first period is longer than said second period;
  generating said logic high signal said second period after said falling edge of the pre-pulse of said caption character data, then generating said logic low signal said second period after said logic high signal is generated, if said carry has not been generated;
  increasing said head address by one if a bit number of said caption character data equals predetermined number, and alternately returning to said step of shifting to the left by one if said bit number does not equal said predetermined number; and
  ending said converting of said caption character data if a current address equals an end address of said caption character data, and alternately returning to said step of storing said caption character data if said current address does not equal said end address of said caption character data.

8. An apparatus for recording and reproducing a caption signal comprised of a character signal combined with a video signal, on an audio track of a video tape, said apparatus comprising:
  input means for inputting character data;
  buffer means for storing said character data;
  processing means for receiving said character data from said buffer means and converting said character data into a pulse code signal during a caption recording mode;
  recording conversion means for converting said pulse code signal into a first mono-audio signal;
  reproducing conversion means for converting a reproduction mono-audio signal into a rectangular pulse signal;
  means for recording said first mono-audio signal onto said audio track of the video tape during said caption recording mode, and for producing said reproduction mono-audio signal from the audio track during a caption reproducing mode;
  said processing means for converting said rectangular pulse signal to said character signal during said caption reproducing mode, wherein said character signal comprises said character data, a clock signal and a chip selection signal;

means for recording a stereo signal on the video tape, and for reproducing said stereo signal from the video tape;

means for receiving said reproduction mono-audio signal during a mode different from said caption recording mode and said caption reproducing mode, and for receiving said stereo signal, to transmit said reproduction mono-audio signal and said stereo signal to an output port;

video signal processor means for receiving said video signal; and on screen display means for generating said caption signal.

9. A method of recording caption data comprised of a reproduced caption signal combined with a video signal, on an audio track of a video tape and displaying said caption data with a video signal, said method comprising:

converting said caption data to a pulse code signal during a caption recording mode;

converting said pulse code signal to a first mono-audio signal during said caption recording mode;

recording said first mono-audio signal on the audio track of the video tape during said caption recording mode;

reproducing said first mono-audio signal from the audio track of the video tape during a caption reproducing mode;

converting said first mono-audio signal reproduced from the audio track to a rectangular pulse signal during said caption reproducing mode;

converting said rectangular pulse signal to said reproduced caption signal during said caption reproducing mode;

generating a display signal during said caption reproducing mode by generating said caption data; and displaying a caption on a visual display during said caption reproducing mode, with content of said caption depending upon said display signal.

10. The method as claimed in claim 9, further comprising:

recording a second mono-audio signal on the audio track of the video tape and reproducing said second mono-audio signal from the audio track during a normal mode different from said caption recording mode and said caption reproducing mode;

recording a stereo signal on the audio track and reproducing said stereo signal from the audio track of the video tape;

enabling transmission of said second mono-audio signal reproduced from the audio track and said stereo signal to an output port during said normal mode; and enabling transmission of said first mono-audio signal and said stereo signal to said output port during said caption reproducing mode.

11. The method of claim 9, wherein said step of converting said caption data to said pulse code signal comprises:

storing a head address of said caption data;

storing said caption data of said head address;

shifting to the left by one said stored caption data and determining whether a carry has been generated;

generating a logic high signal a first period after a falling edge of a pre-pulse of said caption data, then generating a logic low signal a second period after said logic high signal is generated, if said carry has been generated, wherein said first period is longer than said second period;

generating said logic high signal said second period after said falling edge of the pre-pulse of said caption data, then generating said logic low signal said second period after said logic high signal is generated, if said carry has not been generated;

increasing said head address by one if a bit number of said caption data equals a predetermined number, and alternately returning to said step of shifting to the left by one if said bit number does not equal said predetermined number; and ending said converting of said caption data if a current address equals an end address of said caption data, and alternately returning to said step of storing said caption data if said current address does not equal said end address of said caption data.

12. The method as claimed in claim 11, wherein said step of converting said second mono-audio signal to a rectangular pulse signal comprises:

amplifying said second mono-audio signal to generate a first amplified signal;

inverse amplifying said second mono-audio signal to generate a second amplified signal;

converting said first amplified signal to a first rectangular signal;

converting said second amplified signal to a second rectangular signal; and combining said first rectangular signal and said second rectangular signal to generate said rectangular pulse signal.

* * * * *

UNITED STATES PATENT AND TRADEMARK OFFICE
CERTIFICATE OF CORRECTION

PATENT NO. : 5,347,404
DATED : September 13, 1994
INVENTOR(S) : Hyeong- Deok Han It is certified that error appears in the above-indentified patent and that said Letters Patent is hereby corrected as shown below:

Column 1, Line 62    Change "signal" to --signals--;

Line 65    Change "signal" to --signals--;

Column 8, Line 25    Change "where" to --wherein--:

Signed and Sealed this

Twenty-ninth Day of October 1996

Attest:

BRUCE LEHMAN

Attesting Officer      Commissioner of Patents and Trademarks